(12) United States Patent
Agama et al.

(10) Patent No.: US 7,249,530 B2
(45) Date of Patent: Jul. 31, 2007

(54) OIL CONSUMPTION SIMULATING DEVICE

(75) Inventors: Reynaldo Jorge Agama, Peoria, IL (US); Katherine D. Driscoll, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 202 days.

(21) Appl. No.: 11/023,459

(22) Filed: Dec. 29, 2004

(65) Prior Publication Data
US 2006/0137428 A1 Jun. 29, 2006

(51) Int. Cl.
*G01F 25/00* (2006.01)

(52) U.S. Cl. .................... 73/865.6; 73/1.16

(58) Field of Classification Search ........... 73/865.8, 73/1.73, 1.74, 1.16, 1.31, 865.6
See application file for complete search history.

(56) References Cited

U.S. PATENT DOCUMENTS

| | | | |
|---|---|---|---|
| 3,212,318 | A | 10/1965 | Lomax |
| 3,876,037 | A | 4/1975 | Rath, Jr. |
| 4,321,056 | A | 3/1982 | Dimitroff |
| 4,481,931 | A | 11/1984 | Bruner |
| 4,777,821 | A | 10/1988 | Gerve |
| 4,827,762 | A | 5/1989 | Hasselmann |
| 4,987,914 | A | 1/1991 | Adney et al. |
| 5,273,134 | A * | 12/1993 | Hegemier et al. .......... 73/322.5 |
| 5,401,661 | A * | 3/1995 | Florkowski et al. ....... 73/53.06 |
| 5,411,052 | A | 5/1995 | Murray |
| 5,531,105 | A | 7/1996 | Leong et al. |
| 5,701,862 | A * | 12/1997 | Inoue et al. ............. 123/196 S |
| 6,341,629 | B1 | 1/2002 | Clark et al. |
| 2005/0126532 | A1* | 6/2005 | Sugamuna et al. ..... 123/196 R |

FOREIGN PATENT DOCUMENTS

| | | |
|---|---|---|
| EP | 0416237 A1 | 3/1991 |
| EP | 0416237 B1 | 4/1994 |
| JP | 57108717 | 7/1982 |
| JP | 63023092 | 1/1988 |

* cited by examiner

*Primary Examiner*—Hezron Williams
*Assistant Examiner*—Nashmiya Fayyaz
(74) *Attorney, Agent, or Firm*—Finnegan, Henderson, Farabow, Garrett & Dunner

(57) ABSTRACT

An engine lubrication system simulating device is provided, having a reservoir configured to contain engine oil. The simulating device may also include an agitation device configured to agitate oil in the reservoir. In addition, the simulating device may include a circulation system configured to circulate oil between the reservoir and a reserve tank of an oil consumption measuring device and maintain a constant level of oil in the reservoir. Further, the simulating device may include an output port configured to facilitate removal of oil from the reservoir at a known, controlled rate and transport it to a location separate from the reservoir and the oil consumption measuring device.

27 Claims, 2 Drawing Sheets

OIL CONSUMPTION SIMULATING DEVICE

TECHNICAL FIELD

The present disclosure is directed to an engine lubrication system simulating device and, more particularly, to an oil consumption simulating device for testing of oil consumption measuring equipment.

BACKGROUND

Oil consumption can occur in an internal combustion engine in multiple ways. Oil consumption can occur when oil from the crankcase migrates past the piston rings into the combustion chamber and is consequently burned off during combustion of the air/fuel mixture. The byproducts of combustion, including the burned oil, are mostly carried away from the engine with the exhaust. Oil consumption can also occur as oil mist is carried away with engine blowby flows (e.g., when pressure within the crankcase is released by ventilation of crankcase gases).

One way of measuring oil consumption for an internal combustion engine may include using what is known as an "oil scale cart." An oil scale cart includes a reserve oil tank separate from the engine. The oil scale cart may be configured to pump oil from the reserve tank into the engine during the course of an engine bench test. Pumping oil into the engine in this manner can maintain a predetermined amount of oil in the engine despite oil being consumed during operation of the engine. The oil scale cart may include a device for measuring the weight of the reserve tank (e.g., a force transducer, a.k.a. "load cell"). As the oil is pumped out of the reserve tank, the scale measures the reduction in the weight of the reserve tank. Because the oil pumped out of the reserve tank replenishes the oil consumed by the engine, the weight loss of the reserve tank, ideally, may be equivalent to the oil weight lost by the engine.

In practice, it can be difficult to determine whether an oil scale cart is working properly. Although the load cell may be calibrated, the combination of a running engine with an operating oil scale cart is a dynamic system. Such a dynamic system may have variables that can influence the accuracy of the load cell measurement. These variables may include oil temperature, pressure in the engine crankcase, pressure in the reserve tank, the agitation of the oil, flow rate between the engine and the reserve tank, and the rate of oil consumption.

Systems have been developed to verify the measurements made by oil-scale-cart-type oil consumption measuring devices. For example, U.S. Pat. No. 5,273,134, issued on Dec. 28, 1993, to Hegemier et al. ("the '134 patent"), discloses an oil consumption measuring device having two separate measuring systems. The '134 patent includes both a load cell and a metering pump to determine the amount of oil pumped from a reservoir into the engine to compensate for oil consumption.

While the '134 patent may provide a system for verifying the accuracy of the oil consumption measurement, this verification system has shortcomings of its own. For example, the verification system of the '134 patent does not account for certain variables that have been shown to have an effect on the accuracy of oil consumption measurements, such as, for example, oil temperature, oil pressure, oil agitation, oil transfer flow rates (e.g., between the reservoir and the engine), and the actual rate of oil consumption. In addition, the system of the '134 patent provides no engine lubrication system simulating functions to facilitate determination of the effects that these variables may have on the accuracy of oil consumption measurements. Further, the '134 patent provides no troubleshooting or calibrating capability for diagnosing and/or compensating for possible inaccuracies with its own measuring systems. Also, the '134 patent requires additional equipment, such as a separate reservoir used to determine the level of engine oil in the engine being tested. This reservoir may need to be positioned at a particular height with respect to the engine in order for an accurate oil level to be determined, thus adding complexity to the system and its use.

The disclosed engine lubrication system simulating device is directed toward overcoming one or more of the problems set forth above.

SUMMARY OF THE INVENTION

In one aspect, the present disclosure is directed to an engine lubrication system simulating device having a reservoir configured to contain engine oil. The simulating device may also include an agitation device configured to agitate oil in the reservoir. In addition, the simulating device may include a circulation system configured to circulate oil between the reservoir and a reserve tank of an oil consumption measuring device and maintain a constant level of oil in the reservoir. Further, the simulating device may include an output port configured to facilitate removal of oil from the reservoir at a known, controlled rate and transport it to a location separate from the reservoir and the oil consumption measuring device.

In another aspect, the present disclosure is directed to a method of testing an oil consumption measuring device. The method may include attaching the oil consumption measuring device to an engine lubrication system simulating device having a reservoir containing engine oil. The method may also include agitating the oil in the reservoir. In addition, the method may include circulating oil between the simulating device reservoir and the measuring device while maintaining a constant level of oil in the simulating device. Further, the method may include removing oil from the reservoir at a known, controlled output flow rate and transporting the oil to a location separate from the reservoir and the oil consumption measuring device.

DETAILED DESCRIPTION

Reference will now be made in detail to the drawings. Wherever possible, the same reference numbers will be used throughout the drawings to refer to the same or like parts.

Figure 1:
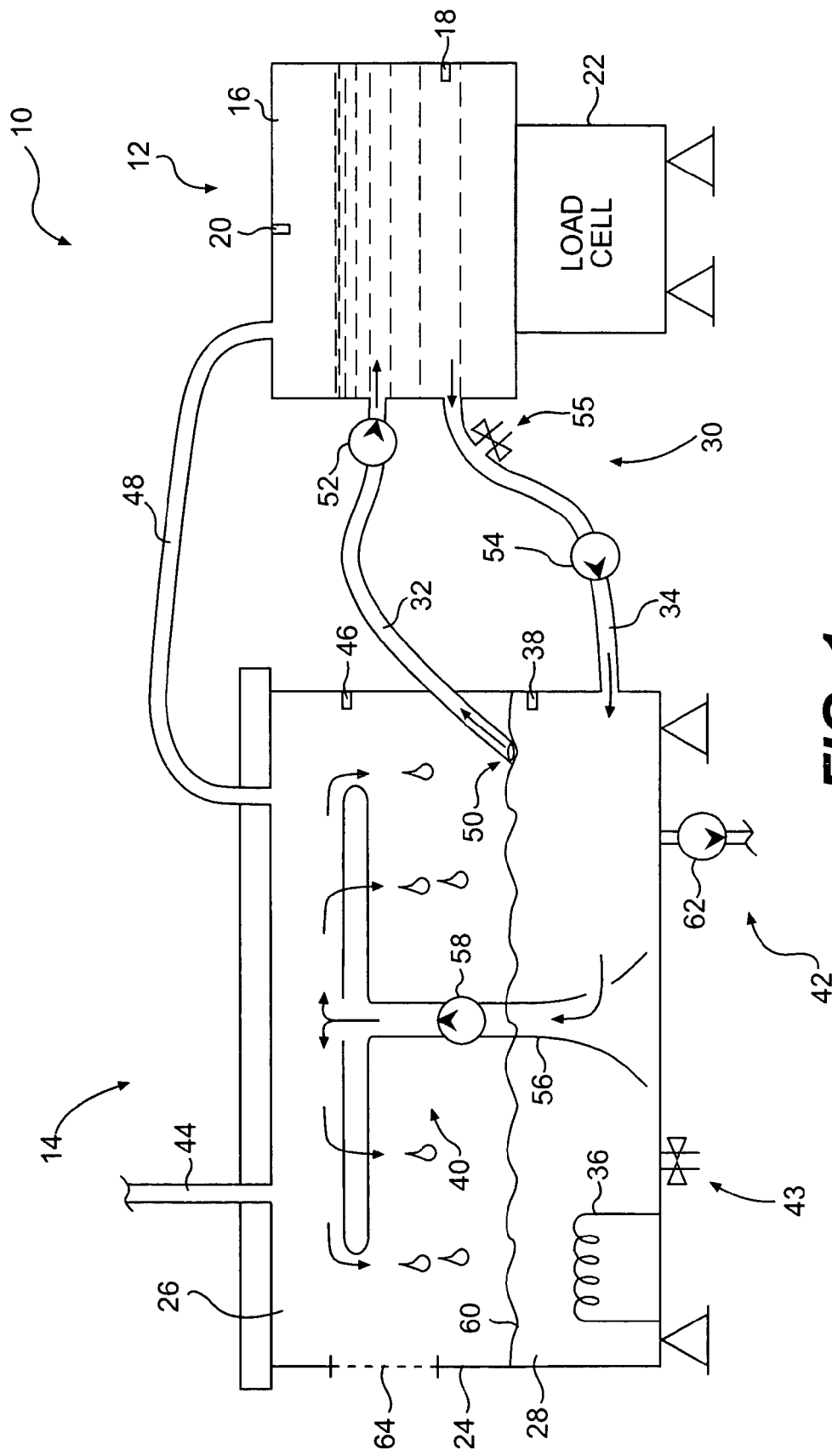
FIG. 1 is a diagrammatic illustration of testing system according to an exemplary disclosed embodiment.

FIG. 1 illustrates a testing system 10 including an oil consumption measuring device 12 (hereafter referred to as "measuring device 12") operatively coupled to an engine lubrication system simulating device 14 (hereafter referred to as "simulating device 14"). Measuring device 12 may include a reserve tank 16 configured to contain a liquid, a reserve tank temperature sensor 18, a reserve tank pressure sensor 20, and a load cell 22 configured to measure a weight of measuring device 12. Simulating device 14 may include a housing 24, which may form a reservoir 26 configured to contain a liquid, such as, for example, a body of oil 28.

Reserve tank 16 may be in fluid communication with reservoir 26 via a circulation system 30, which may include a suction tube 32, and a return tube 34.

In addition, simulating device 14 may include various components configured to facilitate simulation of conditions in a lubrication system of an operating internal combustion engine. Such components may include, for example, a heating device 36, a reservoir temperature sensor 38, an agitation device 40, an output port 42, an aeration testing outlet 43, a pressurizing inlet 44, and a reservoir pressure sensor 46. Simulating device 14 may also include a connection tube 48 between reserve tank 16 and reservoir 26 for equalizing pressure between the two chambers Measuring device 12 may be any kind of oil consumption measuring device, such as, for example, an oil-scale-cart-type measuring device, as described above. Reserve tank 16 may be configured to contain engine oil. Reserve tank temperature sensor 18 may be associated with reserve tank 16 and configured to monitor oil temperature within reserve tank 16. In addition, reserve tank pressure sensor 20 may be associated with reserve tank 16 and configured to monitor pressure within reserve tank 16. Load cell 22 may be any type of weighing device, such as, for example, a pressure transducer. Load cell 22 may be configured to measure a weight of measuring device 12 as described above with regard to oil scale carts.

Measuring device 12 may be operatively coupled to simulating device 14 by circulation system 30 in the same way measuring device 12 would be operatively coupled to an engine during an oil consumption test. Measuring device 12 may be configured to pump oil into simulating device 14 in order to replace the oil withdrawn from reservoir 26 and thereby maintain a constant level of oil in reservoir 26.

Circulation system 30 may be configured to maintain this constant level of oil in reservoir 26 by circulating oil between reserve tank 16 and reservoir 26. This circulation may be effected by suction tube 32 and return tube 34. Suction tube 32 may include an inlet 50 positioned at a predetermined height within reservoir 26. Suction tube 32 may be configured to remove excess oil from reservoir 26 by suctioning off oil that rises above the height of inlet 50. Suction tube 32 may include a suction pump 52 configured to pump oil through suction tube 32 from reservoir 26 to reserve tank 16. Return tube 34 may be configured to transport oil from measuring device 12 into reservoir 26, in order to maintain a desired level of oil in reservoir 26. Return tube 34 may include a return pump 54 to facilitate the transport of oil from reserve tank 16 to reservoir 26. Circulation system 30 may also include flow meters (not shown) associated with suction tube 32 and/or return tube 34.

The aeration level of the oil in system 10 (i.e., the amount of air mixed in with the oil) may be controlled, tested and/or calibrated. A controlled flow of air may be introduced into system 10 via an aeration inlet 55. Aeration inlet 55 may be located at any suitable place within system 10. In one embodiment, aeration inlet 55 may be located upstream from return pump 54, as shown in FIG. 1. The aeration level within reservoir 26 may be measured by periodically withdrawing samples of oil from aeration testing outlet 43. The aeration level may be determined by comparing volumetric measurements of the oil removed before and after the oil is allowed to settle and the air works its way out. That is, the volume of the removed oil may be measured immediately after being removed from reservoir 26. The oil may be allowed to settle, and one or more additional volume measurements may be taken. The difference in volume may indicate the amount of air that was in the oil.

The performance of system 10 and its components may be evaluated for different oil aeration levels. Further, aeration level data may be used to facilitate calibration of measuring device 12. For example, if variations in aeration level are determined to have an effect on the accuracy of measuring device 12, then a correction factor could be determined for various aeration levels to compensate for any inaccuracies in the measurements of measuring device 12.

Heating device 36 may be located at any place associated with system 10 suitable to facilitate heating of oil within system 10. Heating device 36 may include any kind of heating mechanism, such as, for example, burners, heat transfer devices, etc. For example, heating device 36 may include an electrical heating element and may be located within reservoir 26. Heating device 36 may be variably controllable to maintain a desired oil temperature within reservoir 26 in order to simulate oil temperature in an operating internal combustion engine. Reservoir temperature sensor 38 may be configured to monitor oil temperature within reservoir 26. Control of heating device 36 may be based on feedback from reservoir temperature sensor 38.

Agitation device 40 may include any type of agitation device suitable to simulate churning of oil in an internal combustion engine. For example, agitation device 40 may include one or more stirring devices (not shown). Alternatively or additionally, agitation device 40 may include an oil transport column 56. Oil transport column 56 may include an agitator pump 58 configured to pump oil from below a surface 60 of body of oil 28 in reservoir 26 up through oil transport column 56 and discharge the pumped oil above surface 60, allowing it to fall back into body of oil 28.

Output port 42 may be configured to facilitate removal of oil from reservoir 26 at a known, controlled rate and transport it to a location, such as a holding tank (not shown), separate from reservoir 26 and measuring device 12. This removal of oil from reservoir 26 may simulate oil consumption of an internal combustion engine. Output port 42 may be located at any suitable location to effect removal of oil from reservoir 26. For example, output port 42 may be configured to remove oil from a lower region of body of oil 28. Because agitation of oil can cause foaming, removing oil from a lower region of body of oil 28 may minimize the amount of air withdrawn with the oil, thus, enabling a more accurate metering of output flow. Further, output port 42 may include a deaerator (not shown) to remove air from the oil before the output flow is metered. Output port 42 may include a valve (not shown) and/or may be associated with an output pump 62. Output pump 62 may be configured to pump at a relatively low flow rate compared to suction pump 52 and return pump 54. Output pump 62 may be any kind of high-precision, metered, low-flow rate pump. In one embodiment, output pump 62 may be a peristaltic pump.

Pressurizing inlet 44 may be configured to facilitate controllable regulation of pressure within reservoir 26. Reservoir pressure sensor 46 may be located at any suitable location associated with reservoir 26. Reservoir pressure sensor 46 may be configured to monitor pressure within reservoir 26. Control of pressurizing inlet 44 may be based on feedback from reservoir pressure sensor 46. Connection tube 48 between reserve tank 16 and reservoir 26 may be configured to facilitate equalization of pressure between the two chambers.

Reservoir 26 may include at least one transparent portion configured to enable viewing of components internal to reservoir 26 during operation. For example, reservoir 26 may include at least one viewing window 64.

Figure 2:
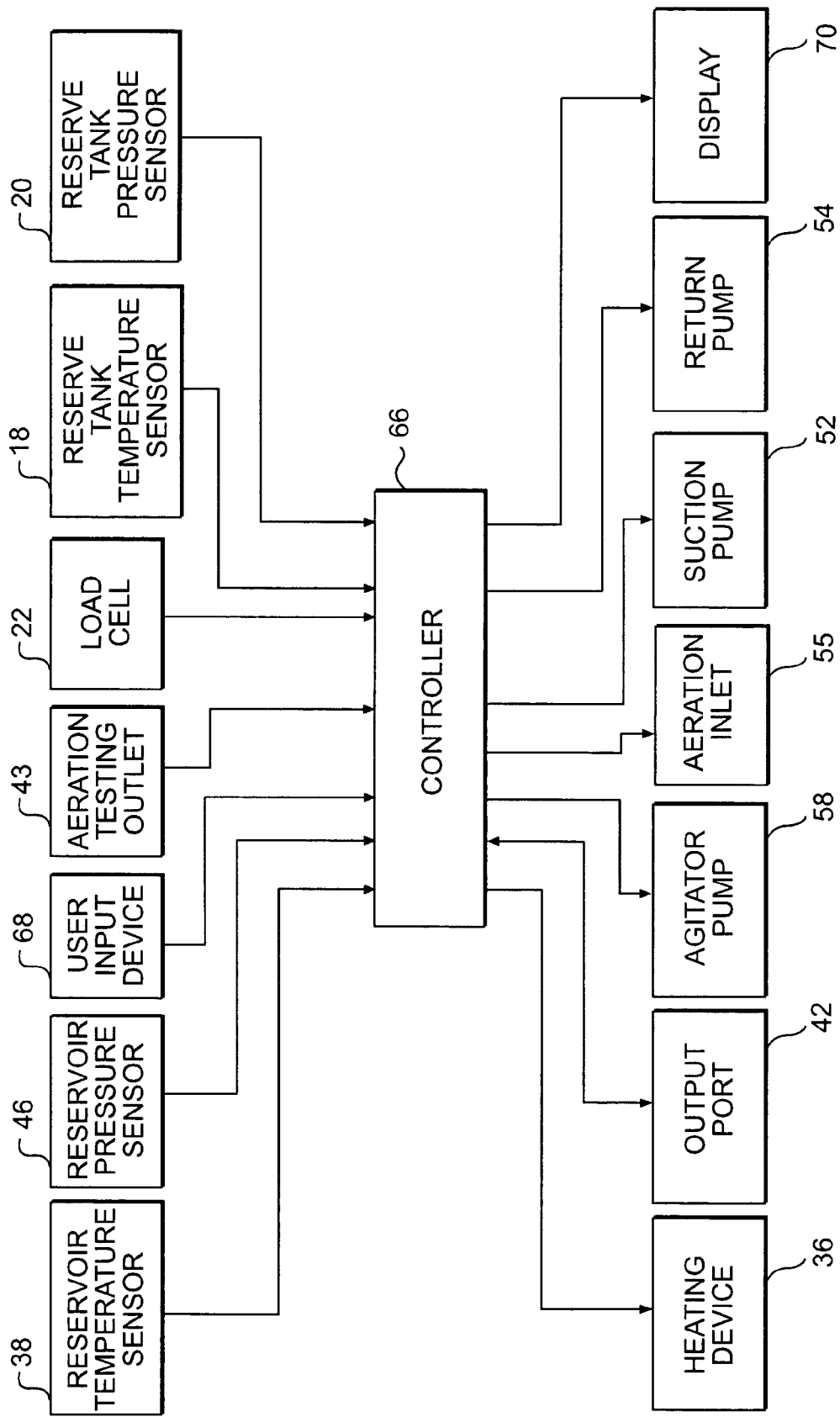
FIG. 2 is a block diagram of a testing system according to an exemplary disclosed embodiment.

As shown in FIG. 2, simulating device 14 may include a controller 66 for monitoring and/or controlling one or more functions of at least one of measuring device 12 and simulating device 14. Controller 66 may be configured to receive input from various sources. Controller 66 may be configured to receive input from components of measuring device 12, such as, for example, load cell 22, reserve tank temperature sensor 18, and reserve tank pressure sensor 20. Controller 66 may also be configured to receive input from components of simulating device 14, such as, for example, reservoir temperature sensor 38, and reservoir pressure sensor 46.

Controller 66 may also be configured to receive input from aeration testing outlet 43 and a user input device 68. User input device 68 may include any type of input mechanism. For example, user input device 68 may include a keypad, touchscreen, mouse, pushbuttons, switches, dials, or any other input device suitable for communicating user input to controller 66.

Controller 66 may also be configured to control one or more components of system 10. For example, controller 66 may be configured to regulate temperature in reservoir 26 by controlling heating device 36. This control may be based on output from at least one of reserve tank temperature sensor 18 and reservoir temperature sensor 38.

Further, controller 66 may be configured to regulate pressure in reservoir 26 by controlling pressure applied to pressurizing inlet 44. This control may be based on feedback from reserve tank pressure sensor 20 or reservoir pressure sensor 46. Control of pressure in reservoir 26 may also be based on information supplied by user input device 68.

Controller 66 may also be configured to control operation of output port 42, agitator pump 58, aeration inlet 55, suction pump 52, and/or return pump 54. This control may be based on input from user input device 68 and/or input from one or more other input sources discussed above.

In addition, controller 66 may receive flow information from output port 42 or, if controlled by controller 66, from within controller 66. This flow information may be compared to output from load cell 22 received by controller 66. Because the removal of oil via output port 42 may be the main parameter measured by measuring device 12 with load cell 22, discrepancies between flow information of output port 42 and measurements taken by load cell 22 may be indicative of one or more malfunctions with measuring device 12. Accordingly, controller 66 may be configured to analyze this information in order to facilitate or perpetuate troubleshooting and/or calibration of measuring device 12.

Controller 66 may also output information to a display 70. Display 70 may provide visual feedback regarding operation of one or more components of system 10. Display 70 may be located at any suitable location and may be any kind of display. For example display 70 may include simple indicator lights and/or more sophisticated screen displays, such as, for example, cathode ray tubes (CRTs), liquid crystal displays (LCDs), plasma screens, and the like.

Alternatively or additionally, controller 66 may provide information to an entity external to system 10 for analysis or review by any interested parties such as owners, renters, customers, and/or service technicians. For example, this information may be downloaded (e.g., with a laptop or PDA) or sent to a processing facility as a radio signal, via satellite, or any other type of data link.

INDUSTRIAL APPLICABILITY

In practice, it can be difficult to determine whether an oil consumption measuring device is measuring accurately. The disclosed system may be used to determine the accuracy of a measuring device by simulating a known amount of oil consumption and comparing it to the oil consumption measurement taken by the measuring device.

In addition, simulating device 14 may simulate various conditions of an operating oil pan/sump of an engine, thus enabling the effects of such conditions on the accuracy of the oil consumption measurement to be determined. For example, simulating device 14 may be used to determine the way measuring device 12 responds to variables such as oil temperature, pressure in the engine crankcase, pressure in reserve tank 16, the agitation of the oil in the engine crankcase and/or reserve tank 16, flow rate of oil being circulated between the engine and reserve tank 16, the rate of oil consumption, etc.

Further, the determined effects of these conditions may be used to troubleshoot and/and or calibrate measuring device 12. For example, simulating device 14 may be used to simulate malfunctions with a component of measuring device 12, such as return pump 54. It could be determined whether pump efficiency and/or flow rate has any impact on the accuracy of measuring device 12. From that analysis, it could also be determined whether certain operating parameters of return pump 54 need to be within a particular range in order for the measuring device to work accurately. In addition, adjustments may be made to measuring device 12 and/or a correction factor may be applied to its measurements in order to compensate for any inaccuracies related to operation of return pump 54. Similar analysis may be undertaken with regard to any other functional components of measuring device 12.

Although the simulating device has been discussed with regard to use with oil-scale-cart-type measuring devices, the simulating device may be used for calibrating and or testing of any kind of oil consumption measurement device.

It will be apparent to those skilled in the art that various modifications and variations can be made to the disclosed engine lubrication system simulating device without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An oil consumption simulating device for testing of an oil consumption measuring device, the simulating device comprising:
    a reservoir configured to contain oil;
    an agitation device configured to agitate oil in the reservoir; and
    a circulation system configured to circulate oil between the reservoir and a reserve tank of the oil consumption measuring device and maintain a constant level of oil in the reservoir;
    wherein the oil consumption simulating device includes a controller configured control an output flow rate of oil from the reservoir to a holding tank isolated from the circulation system to thereby simulate oil consumption of an engine by removing a portion of the oil from the reservoir at a known, controlled rate and storing the portion of the oil in the holding tank.

2. The device of claim 1, further including a heating device configured to controllably heat oil within at least one of the reservoir and the circulation system.

3. The device of claim 2, wherein the heating device is an electrical heating element.

4. The device of claim 1, further including an inlet configured to facilitate controlled pressurization of the reservoir.

5. The device of claim 1, wherein the reservoir includes at least one transparent portion configured to enable viewing of components internal to the reservoir during operation.

6. The device of claim 1, wherein the circulation system includes at least one suction tube having an inlet positioned at a predetermined height within the reservoir, the suction tube being configured to remove excess oil from the reservoir.

7. The device of claim 1, wherein the circulation system includes at least one return tube configured to transport oil into the reservoir from the oil consumption measuring device.

8. The device of claim 1, further including a connection tube configured to facilitate equalization of pressure between the reservoir and the reserve tank.

9. The device of claim 1, wherein the agitation device includes an oil transport column configured to pump oil from below a surface of a body of oil in the reservoir up through the column and discharge the pumped oil above the surface of the body of oil.

10. The device of claim 1, wherein the controller is further configured to control at least one of oil temperature, reservoir pressure, and the agitation device.

11. The device of claim 1, wherein the controller is further configured to monitor oil consumption measurements of the oil consumption measuring device and compare the measurements to a known output flow rate of oil from the reservoir.

12. The device of claim 1, wherein the oil removed from the reservoir and stored in the holding tank is removed from an output port configured to facilitate removal of oil from an area near a bottom portion of the reservoir.

13. The device of claim 12, further including an output pump associated with the output port.

14. The device of claim 1, further including an aeration inlet configured to introduce air at a controlled rate into at least one of the reservoir and the circulation system; and
an aeration testing outlet configured to facilitate sampling of oil from the reservoir to determine an amount of air in the oil.

15. An oil consumption simulating device for testing of an oil consumption measuring device, the simulating device comprising:
a reservoir configured to contain engine oil and be coupled in fluid communication with a reserve tank of the oil consumption measuring device, the reservoir having at least one transparent portion configured to enable viewing of components internal to the reservoir during operation;
an agitation device configured to agitate oil in the reservoir;
a circulation system configured to circulate oil between the reservoir and the reserve tank while maintaining a constant level of oil in the reservoir, the circulation system including:
at least one suction tube having a first inlet positioned at a predetermined height within the reservoir and a suction pump associated therewith, the suction tube being configured to remove excess oil from the reservoir, and
at least one return tube having a return pump associated therewith and configured to transport oil into the reservoir from the reserve tank;
an electrical heating element configured to controllably heat oil within at least one of the reservoir and the circulation system;
a second inlet configured to facilitate controlled pressurization of the reservoir; and
a connection tube configured to facilitate equalization of pressure between the reservoir and the reserve tank;
wherein the oil consumption simulating device is configured to simulate oil consumption of an engine by removing a portion of the oil from the reservoir at a known, controlled rate and storing the portion of the oil in a holding tank isolated from the circulation system.

16. The device of claim 15, wherein the oil removed from the reservoir and stored in the holding tank is removed from an output port configured to facilitate removal of oil from an area near a bottom portion of the reservoir.

17. The device of claim 16, further including an output pump associated with the output port.

18. The device of claim 17, further including an aeration inlet configured to introduce air at a controlled rate into at least one of the reservoir and the circulation system; and
an aeration testing outlet configured to facilitate sampling of oil from the reservoir to determine an amount of air in the oil.

19. A method of testing an oil consumption measuring device, comprising:
attaching the oil consumption measuring device to an engine lubrication system simulating device having a reservoir containing engine oil;
agitating the oil in the reservoir;
circulating oil between the simulating device reservoir and the measuring device while maintaining a constant level of oil in the simulating device;
removing oil from the reservoir at a known, controlled output flow rate and transporting the oil to a location separate from the reservoir and the oil consumption measuring device; and
monitoring oil consumption measurements of the oil consumption measuring device and comparing the measurements to the known, controlled output flow rate.

20. The method of claim 19, further including controllably heating the circulating oil with a heating device.

21. The method of claim 20, wherein the heating device is an electrical heating element associated with the reservoir.

22. The method of claim 19, further including controlling pressure within the reservoir.

23. The method of claim 19, further including equalizing pressure between the reservoir and a reserve tank of the oil consumption measuring device.

24. The method of claim 19, further including viewing one or more components internal to the reservoir during operation through a transparent portion of the reservoir.

25. The method of claim 19, further including controlling at least one of oil temperature, reservoir pressure, aeration level, agitation, and the output flow rate of oil from the reservoir to the separate location.

26. The method of claim 19, wherein the oil is removed from an area near a bottom portion of the reservoir.

27. The method of claim 19, further including introducing air at a controlled rate into at least one of the reservoir and the circulation system; and
sampling oil from the reservoir to determine an amount of air in the oil.

* * * * *